June 15, 1926.
W. A. M. DE VASCONCELLOS
CLUTCH CONTROL
Filed Nov. 13, 1924    2 Sheets-Sheet 1
1,589,126
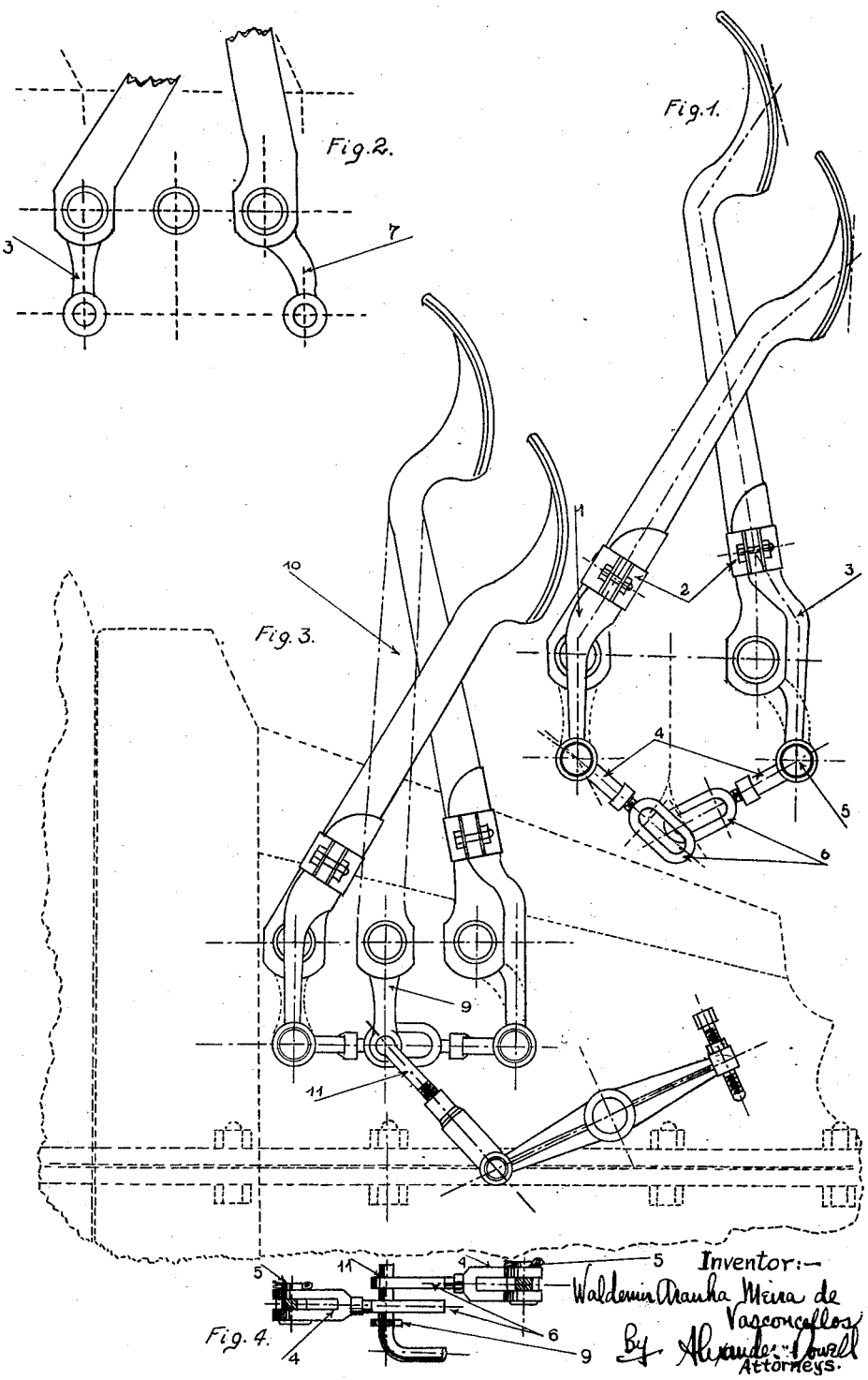

June 15, 1926.
W. A. M. DE VASCONCELLOS
1,589,126
CLUTCH CONTROL
Filed Nov. 13, 1924    2 Sheets-Sheet 2
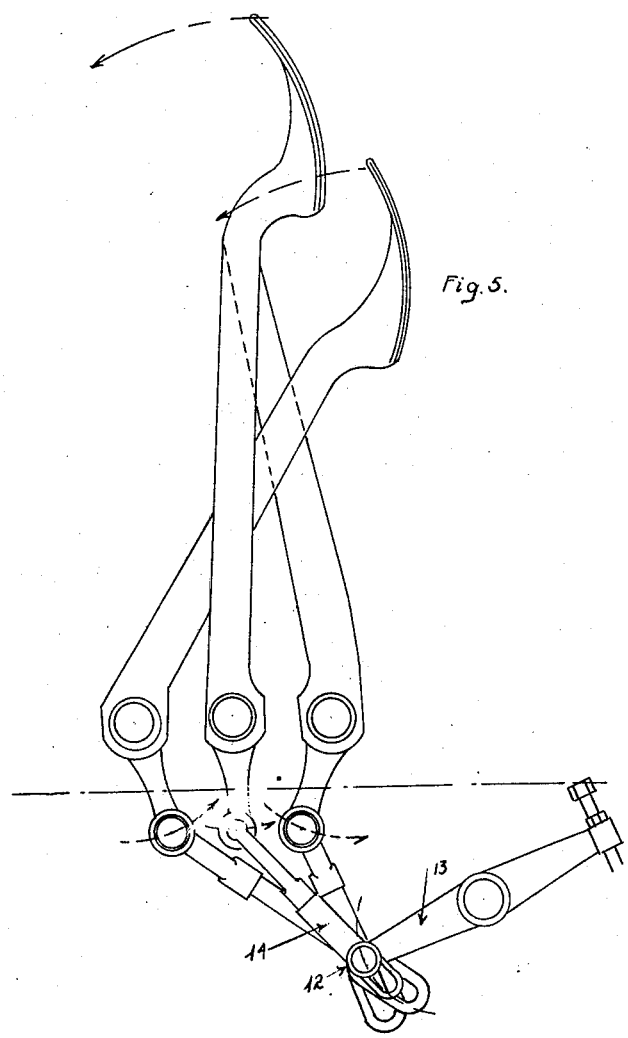
Fig. 5.
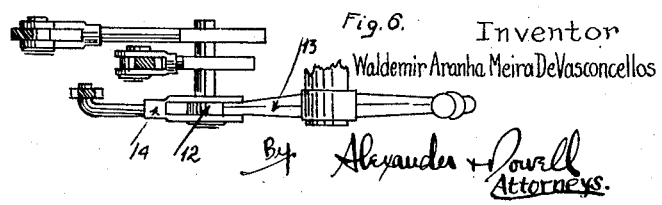
Fig. 6.    Inventor
Waldemir Aranha Meira DeVasconcellos
By Alexander + Powell
Attorneys.

Patented June 15, 1926.

1,589,126

UNITED STATES PATENT OFFICE.

WALDEMIR ARANHA MEIRA DE VASCONCELLOS, OF RIO DE JANEIRO, BRAZIL.

CLUTCH CONTROL.

Application filed November 13, 1924. Serial No. 749,757.

This invention relates to a device comprising two extension units, one of which is attached to the brake pedal and the other to the reverse pedal in the drawings in which:

Fig. 1 is an elevation showing the removable attachment applied to the brake and reverse pedals.

Fig. 2 is an elevation showing an integral arrangement for the brake and reverse pedals.

Fig. 3 is an elevation showing the assembly applied to a "Ford" automobile.

Fig. 4 is a detail horizontal section on the line 4—4, Fig. 3.

Fig. 5 is an elevation showing a modified construction and arrangement of the attachment applied to a "Ford" automobile.

Fig. 6 is a horizontal section on the line 6—6, Fig. 5.

The first unit consists of an attachment which is applied to the brake pedal 3, Fig. 1, by means of clamps, by soldering, brazing or welding it to the pedal, or it may form an integral part with the pedal, as shown in Fig. 2, or by any other appropriate means, which will ensure a perfect attachment between said extension unit and the pedal to which it is to be applied, Figs. 1 and 2. To the end of each unit and by means of a pin 5, Figs. 1 and 4, is connected a knuckle joint 4, Figs. 1 and 4, which articulates with said unit. To the other end of the knuckle joint is threaded a slotted flat piece 6. Figs. 1 and 4, against which is fitted a rod or link 11, Figs. 3 and 4, which passes through the aperture or eyelet in the lower part of clutch pedal 9, Fig. 3, or at the point of connection 12, Figs. 5 and 6 of clutch lever 13, Figs. 5 and 6 with the piece 14. Figs. 5 and 6, which connects the pedal with the clutch arrangement.

The arrangement of the reverse pedal is identical to that of the brake pedal in respect to parts 2, 4, 5 and 6, Figs. 1 and 4, but differs in respect to part 1, Fig. 1, which requires special shape and dimensions, according to the pedal to which it is to be attached.

The device shown in Figs. 1 and 3 may be applied to any type of automobile of which the change of speed is effected through planetary gears. The arrangement illustrated in Fig. 2 shows said units as forming an integral part with the respective pedals. Shown in Fig. 5 also.

An object of the unit which is applied to the brake pedal is to enable said pedal to simultaneously release the clutch and apply the brake. The object of the unit which is applied to the reverse pedal is to enable said pedal alone to unclutch and immediately reverse the car.

The device will be more clearly understood by means of a reference to Fig. 3, where it is shown in connection with a Ford car, the change of speed of which is of the type to which the invention is to be applied.

Claims:

1. In combination with clutch mechanism having a lever, a clutch pedal; a link having one end connected with the clutch lever, the other end of said link being bent at right angles to and connected with the clutch pedal; a brake pedal adjacent the clutch pedal; and a slotted member pivoted to said brake pedal and having its slot engaging the bent portion of said link, whereby as the brake pedal is operated the clutch mechanism will be simultaneously released.

2. In combination with clutch mechanism having a lever, a clutch pedal having an extension beyond its pivot; a link having one end pivotally connected with the clutch lever, the other end of said link being bent at right angles to and passing through the extension on the clutch pedal; a brake pedal adjacent the clutch pedal and having an extension beyond its pivot; and a slotted member pivoted to said extension on the brake pedal, and having its slot engaging the bent portion of said link, whereby as the brake pedal is operated the clutch mechanism will be simultaneously released.

3. In combination with clutch mechanism having a lever, a clutch pedal; a link having one end connected with the clutch lever the other end of said link being bent at right angles to, and connected with the clutch pedal; a brake pedal adjacent the clutch pedal; a slotted member pivoted to said brake pedal and having its slot engaging the bent portion of said link; a reverse pedal adjacent the clutch pedal; and a slotted member pivoted to said reverse pedal and having its slot engaging the bent portion of said link; whereby as the brake or reverse pedals are operated the clutch mechanism will be simultaneously released.

4. In combination with clutch mechanism having a lever, a clutch pedal having an extension beyond its pivot; a link having one end pivotally connected with the clutch lever the other end of said link being bent at right angles to and passing through the clutch pedal extension; a brake pedal adjacent the clutch pedal and having an extension beyond its pivot; a slotted member pivoted to said brake pedal extension and having its slot engaging the bent portion of said link; a reverse pedal adjacent the clutch pedal and having an extension beyond its pivot; and a slotted member pivoted to the reverse pedal extension and having its slot engaging the bent portion of said link; whereby as the brake or reverse pedals are operated the clutch mechanism will be simultaneously released.

WALDEMIR ARANHA MEIRA DE VASCONCELLOS